(12) United States Patent (10) Patent No.: US 9,820,318 B2
Ren et al. (45) Date of Patent: Nov. 14, 2017

(54) INFORMATION PROCESSING APPARATUS

(71) Applicant: BROTHER KOGYO KABUSHIKI KAISHA, Nagoya-shi, Aichi-ken (JP)

(72) Inventors: Yongyong Ren, Nagoya (JP); Kunihito Terashita, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 71 days.

(21) Appl. No.: 14/867,825

(22) Filed: Sep. 28, 2015

(65) Prior Publication Data

US 2016/0095146 A1 Mar. 31, 2016

(30) Foreign Application Priority Data

Sep. 30, 2014 (JP) ................................. 2014-201698

(51) Int. Cl.
*H04W 4/00* (2009.01)
*H04W 76/02* (2009.01)
*H04W 48/20* (2009.01)
*H04W 48/16* (2009.01)
*H04W 88/02* (2009.01)
*H04W 88/08* (2009.01)
*H04W 84/12* (2009.01)

(52) U.S. Cl.
CPC ......... *H04W 76/023* (2013.01); *H04W 48/20* (2013.01); *H04W 48/16* (2013.01); *H04W 84/12* (2013.01); *H04W 88/02* (2013.01); *H04W 88/08* (2013.01)

(58) Field of Classification Search
CPC combination set(s) only.
See application file for complete search history.

(56) References Cited

U.S. PATENT DOCUMENTS 7,769,837 B2 * 8/2010 Nogawa .............. H04L 41/0806
370/338
8,319,835 B2 * 11/2012 Azuma ................ G11B 27/034
348/207.1
8,346,939 B2 * 1/2013 Tomita .................... G06F 21/10
370/260

(Continued)

FOREIGN PATENT DOCUMENTS

JP 2007-166075 A 6/2007
JP 2008-053978 A 3/2008

*Primary Examiner* — Frank Duong
(74) *Attorney, Agent, or Firm* — Merchant & Gould P.C.

(57) ABSTRACT

An information processing apparatus includes: a communication interface; an operation device; a storage configured to store connection information and identification information relating to at least one wireless terminal to which the information processing apparatus can be connected over wireless communication; a controller. The controller is configured to: when a wireless connection to a wireless terminal is instructed, determine a first wireless terminal as a wireless terminal to which the information processing apparatus is to be connected; when first connection information and first identification information relating to the first wireless terminal are stored in the storage, determine whether the wireless connection with the first wireless terminal is being established; and when the wireless connection with the first wireless terminal is being established, maintaining the wireless connection with the first wireless terminal.

12 Claims, 5 Drawing Sheets

(56) References Cited

U.S. PATENT DOCUMENTS

2005/0099962 A1* 5/2005 Matsuda ............ H04L 41/0253
 370/254
2011/0128389 A1 6/2011 Maeda et al.

* cited by examiner

INFORMATION PROCESSING APPARATUS

CROSS REFERENCE TO RELATED APPLICATION

The present application claims priority from Japanese Patent Application No. 2014-201698, which was filed on Sep. 30, 2014, the disclosure of which is herein incorporated by reference in its entirety.

BACKGROUND

Technical Field

The following disclosure relates to an information processing apparatus capable of performing wireless communication.

Description of the Related Art

There is known an information processing apparatus configured to establish wireless connection with a wireless terminal in the form of an access point to carry out data communication with another information processing apparatus via the access point.

SUMMARY

Information processing apparatuses constructed with small size or at low cost are in most cases provided with only a small-size display having a low display capability. It is difficult for such information processing apparatuses to display (i) service set IDs (SSIDs) assigned respectively to connectable access points and (ii) their respective current wireless connection statuses, on the display at a time. To establish wireless connection, accordingly, a user may instruct a connection processing for connecting his or her information processing apparatus to a desired access point without checking its current wireless connection status. In the case where the wireless connection has already been established between the information processing apparatus and the desired access point, an unnecessary reconnection processing is executed for the access point with which the wireless connection has already been established.

Accordingly, an aspect of the disclosure relates to an information processing apparatus which does not execute an unnecessary processing when a user instructs wireless connection between the information processing apparatus and a wireless terminal.

In one aspect of the disclosure, an information processing apparatus includes: a communication interface; an operation device; a storage; and a controller. The controller is configured to perform: determining whether an instruction for a wireless connection to a wireless terminal is accepted via the operation device; in response to determining that the instruction is accepted via the operation device, determining a first wireless terminal as a wireless terminal to which the information processing apparatus is to be connected, the first wireless terminal being one of at least one wireless terminal to which the information processing apparatus is allowed to be connected via the communication interface over wireless communication; determining whether first connection information and first identification information are stored in the storage, the first connection information being as connection information relating to the first wireless terminal, the first identification information being as identification information relating to the first wireless terminal, the connection information and the identification information relating to the at least one wireless terminal to which the information processing apparatus is allowed to be connected; in response to determining that the first connection information and the first identification information are stored in the storage, determining whether the wireless connection with the first wireless terminal is being established; and in response to determining that the wireless connection with the first wireless terminal is being established, maintaining the wireless connection with the first wireless terminal which is being established.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENT

Figure 1:
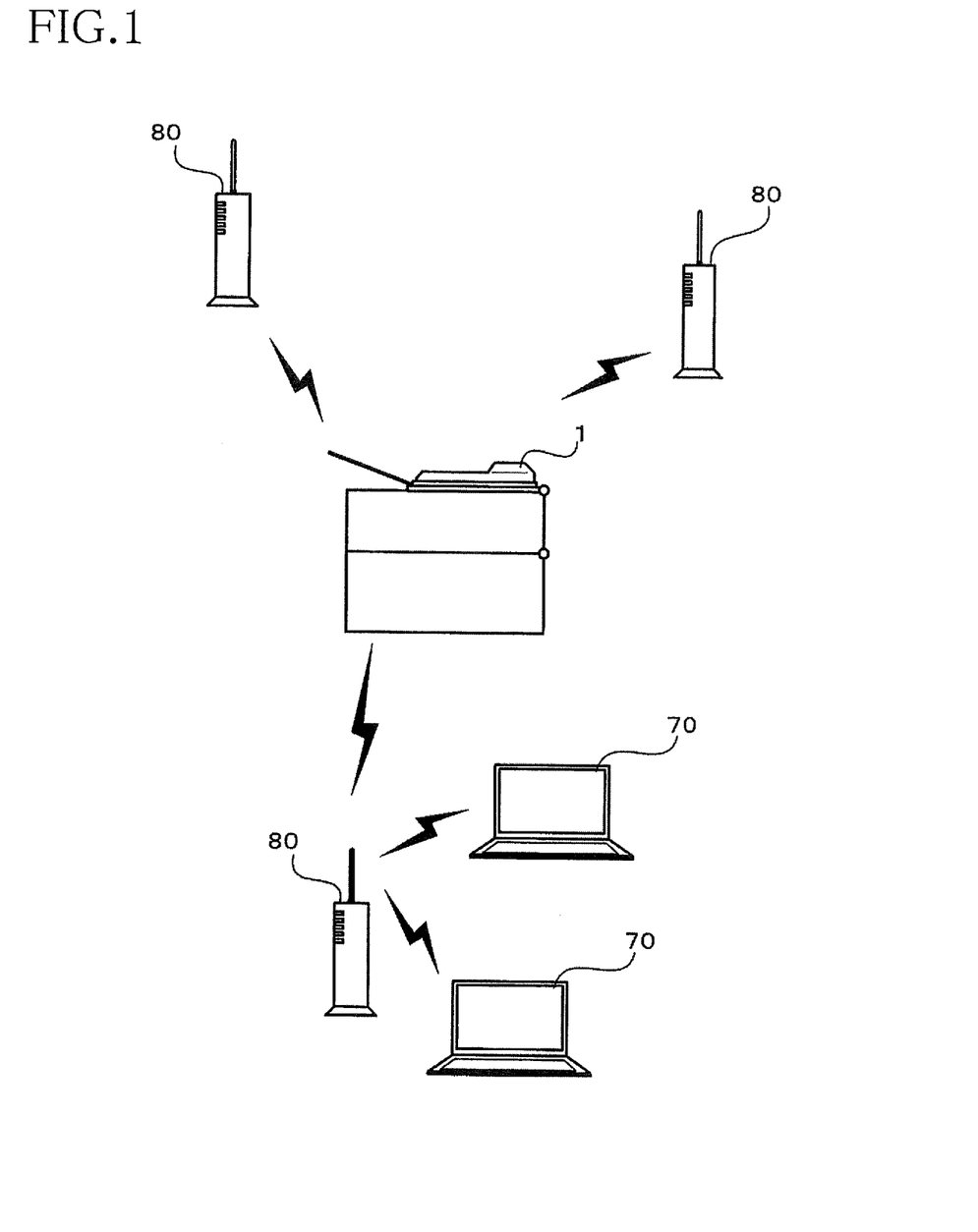
FIG. 1 is a schematic view illustrating a network to which is connected a multi-function peripheral (MFP) according to an embodiment.

Hereinafter, there will be described an information processing apparatus according to one embodiment by reference to the drawings. In the present embodiment, one example of the information processing apparatus is a multi-function peripheral (MFP) having a scanning function and a printing function. As illustrated in FIG. 1, an MFP 1 establishes wireless communication with an access point 80 (one example of a wireless terminal) to connect to a network containing another information processing apparatus (e.g., PCs 70 in FIG. 1) communicable via the access point 80. The MFP 1 is connectable to a desired network by switching among the access points 80 for wireless communication.

Figure 2:
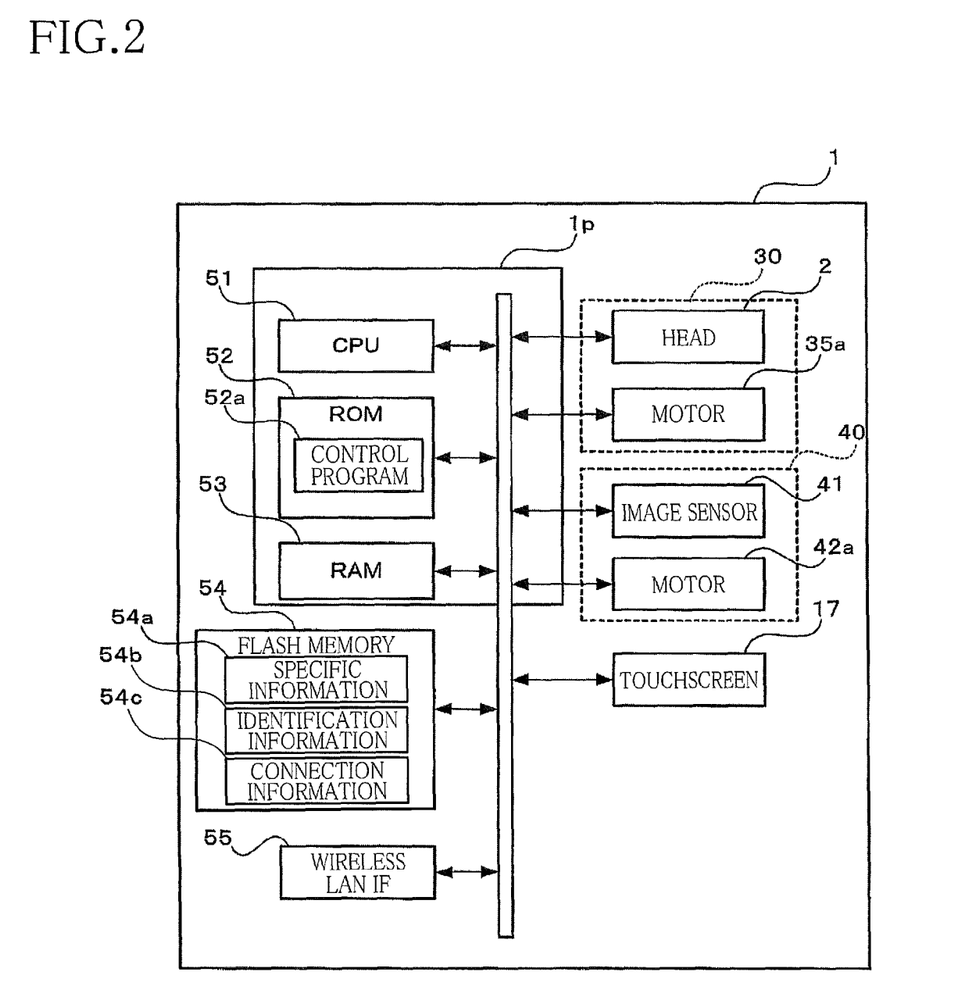
FIG. 2 is a block diagram illustrating the MFP illustrated in FIG. 1.

As illustrated in FIG. 2, the MFP 1 includes a printer unit 30 as one example of an image recording device and a scanner unit 40 as one example of an image reading device. The printer unit 30 includes an ink-jet head 2 and a motor 35*a* for applying a driving force to rollers of a conveying device which conveys a recording sheet. The scanner unit 40 includes an image sensor 41, a feeder for conveying a document, and a motor 42*a* for applying a driving force to rollers of the feeder 42. Examples of the image sensor include a contact image sensor (CIS) and a charge coupled device (CCD).

The MFP 1 includes a controller 1*p* which includes a CPU 51, a ROM 52, and a RAM 53. The controller 1*p* is electrically connected to the head 2, the motor 35*a*, the image sensor 41, the motor 42*a*, a touchscreen 17, a flash memory 54, and a wireless LAN (Local Area Network) interface 55.

The touchscreen 17 is a user interface, as one example of an operation device, having an input function and a display function. The touchscreen 17 displays operations of the MFP 1 and accepts an input operation performed by a user. Specifically, the touchscreen 17 displays an image on its surface in response to a received signal and outputs a signal in response to a user operation.

The wireless LAN interface 55 transmits and receives data via the access points 80 to and from various kinds of information processing apparatuses, such as the PCs 70, connected to the LAN on which the MFP 1 lies. The data transfer is carried out over the wireless communication. In the present embodiment, the data transfer is carried out using Wi-Fi according to IEEE 802.11.

The ROM 52 stores a firmware, various settings, initial values, and other similar information. One example of the firmware is a control program 52a for controlling the MFP 1. The RAM 53 is used as a working area from which various kinds of control programs are read or as a storage area for temporarily storing data. The flash memory 54 stores a set of specific information 54a, identification information 54b, and, connection information 54c which relate to the wireless communication performed over the wireless LAN. Examples of the specific information 54a include: a media access control address (MAC address) and an internet protocol address (IP address) assigned to the wireless LAN interface 55; and other parameters for the wireless communication.

Figure 3:
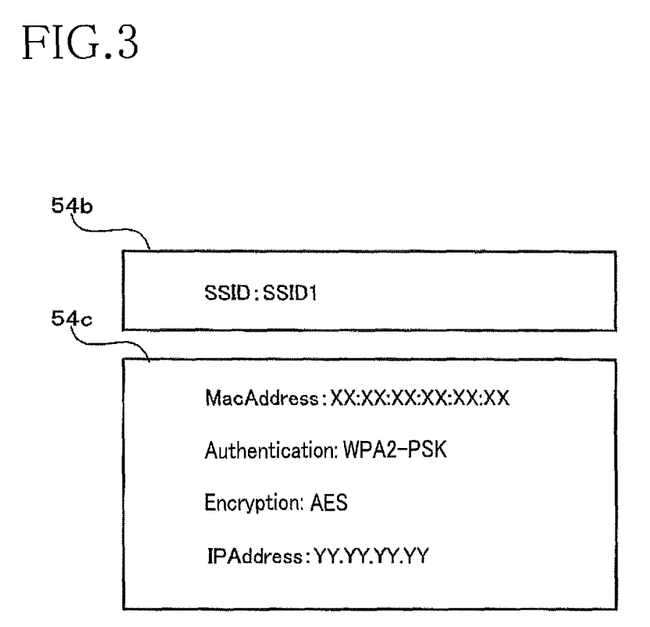
FIG. 3 is a view for explaining information stored in a flash memory illustrated in FIG. 2.

As illustrated in FIG. 3, each of the identification information 54b and the connection information 54c is information which is used for establishment of the wireless communication between the MFP 1 and the access point 80 over the wireless LAN. Specifically, the identification information 54b is a service set ID (SSID) assigned to a corresponding one of the access points 80. The connection information 54c stores information relating to the access point 80 such as a MAC address, an authentication type, an encryption type, and an IP address. Each of the identification information 54b and the connection information 54c stored in the flash memory 54 is information relating to the access point 80 with which the MFP 1 establishes wireless communication previously. The flash memory 54 may store a plural pairs of the identification information 54b and the connection information 54c. Since the wireless LAN interface 55 is capable of connecting to only a predetermined number of access points 80 at a time (in the present embodiment, the wireless LAN interface 55 is capable of connecting to only a single access point 80 at a time), the wireless LAN interface 55 is not limited to connecting to all the access points 80 corresponding to the respective pairs of the identification information 54b and the connection information 54c stored in the flash memory 54.

The CPU 51 reads the control program 52a from the ROM 52 and receives signals from various sensors, and controls the components and devices of the MFP 1 while storing results of executions and operations of the control program 52a and the sensors.

According to the control program 52a executed, the MFP 1 can execute various processings in response to commands received via the touchscreen 17 or from the PC 70 over the LAN (via the wireless LAN interface 55). Examples of the processings include: a print processing for causing the printer unit 30 to print an image on a recording medium; and a scan processing for causing the scanner unit 40 to read a document. Upon execution of the print processing, the printer unit 30 prints an image on a sheet based on print data received with the command. Upon execution of the scan processing, the scanner unit 40 scans an image printed on a sheet. The MFP 1 can execute a copy processing for executing the scan processing and then executing the print processing such that an image is printed on a sheet based on image data obtained in the scan processing.

Figure 4:
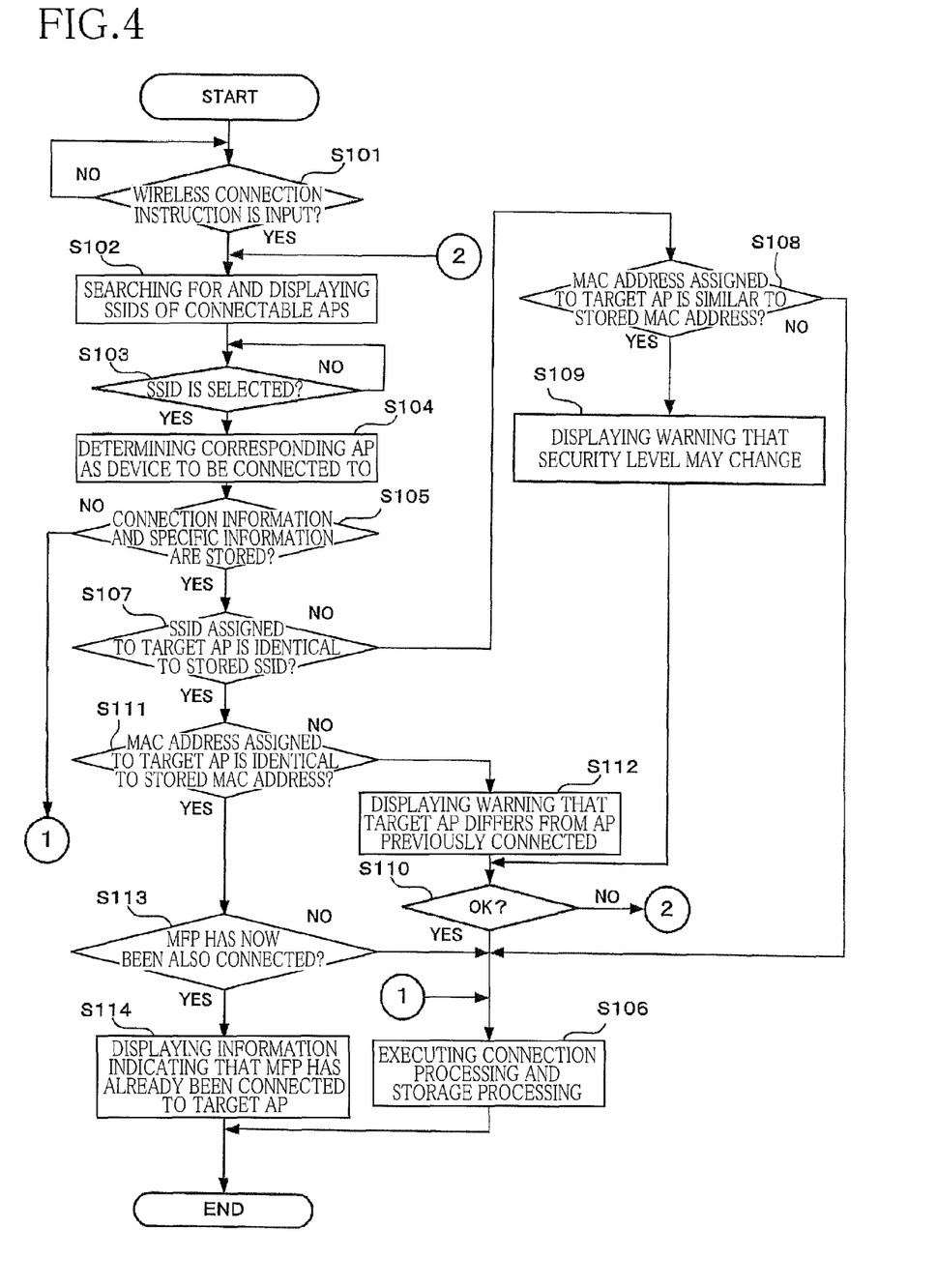
FIG. 4 is a flow chart illustrating a procedure of processings executed by a controller of the MFP illustrated in FIG. 1.

There will be next explained, with reference to FIGS. 4 and 5, a procedure of operations and processings performed when a user connects the MFP 1 to a desired LAN. For example, in the case where the user connects the MFP 1 to the LAN to which the PC 70 owned by the user is connected, the user needs to establish wireless communication between the MFP 1 and one of the access points 80 as a wireless terminal connected to the LAN. Thus, the user needs to operate the touchscreen 17 to input a wireless connection instruction to the MFP 1, and the wireless connection instruction indicates that the user wants to connect the MFP 1 to any of the access points 80.

Figure 5A:
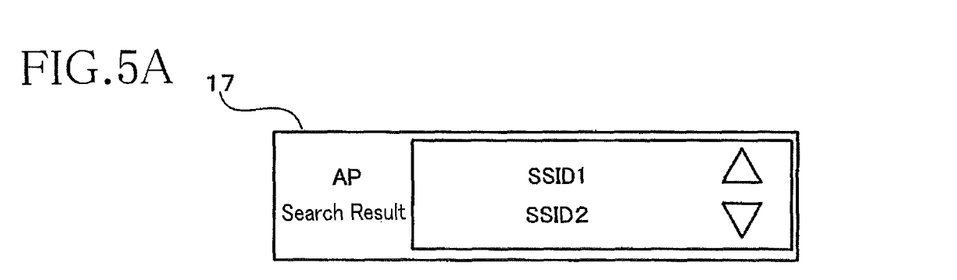
FIGS. 5A through 5D are views each illustrating information displayed on a touchscreen illustrated in FIG. 2.

When the CPU 51 determines that the wireless connection instruction is input to the MFP 1 (S101: YES), the CPU 51 at S102 searches a communication range for an access point 80 which can perform wireless communication with the MFP 1, and then the CPU 51 displays a result of the search on the touchscreen 17. In the search of the communication range, the CPU 51 receives information relating to each access point 80 which can perform wireless communication with the MFP 1, and examples of the information include: an SSID as the identification information; a MAC address as the connection information; an authentication type; and an encryption type. As illustrated in FIG. 5A, the result of the search is displayed as a list of SSIDs assigned to the respective detected access points 80 such that the displayed SSIDs can be scrolled. The CPU 51 waits until the user operates the touchscreen 17 to select one of the displayed SSIDs (S103: NO). When the CPU 51 determines that one of the SSIDs is selected by the user (S103: YES), the CPU 51 at S104 determines one of the access points 80 which is assigned with the selected SSID (noted that the access point 80 is one example of a first wireless terminal), as an access point 80 to which the MFP 1 is to be connected. The CPU 51 at S105 determines whether one or more pairs of the identification information 54b and the connection information 54c are stored in the flash memory 54.

When the CPU 51 determines that no pair of the identification information 54b and the connection information 54c are stored in the flash memory 54 (S105: NO), the CPU 51 at S106 executes (a) a connection processing for establishing wireless communication between the MFP 1 and the access point 80 to which the MFP 1 is to be connected (hereinafter may be referred to as "connection-target access point 80") and (b) a storage processing for storing (i) the SSID assigned to the connection-target access point 80 as the identification information 54b (as one example of first identification information) and (ii) the MAC address, the authentication type, the encryption type, the IP address relating to the connection-target access point 80 as the connection information 54c (as one example of first connection information), into the flash memory 54 as one example of a non-transitory storage medium, and the flow in FIG. 4 ends.

When the CPU 51 at S105 determines that one or more pairs of the identification information 54b and the connection information 54c are stored in the flash memory 54 (S105: YES), the CPU 51 at S107 determines whether the SSID assigned to the connection-target access point 80 determined at S104 is identical to any of the SSIDs (each as the identification information 54b) stored in the flash memory 54. When the CPU 51 at S107 determines that the SSID assigned to the connection-target access point 80 is not identical to any of the SSIDs (each as the identification information 54b) stored in the flash memory 54 (S107: NO), the CPU 51 at S108 determines whether the MAC address assigned to the connection-target access point 80 is similar to any of the MAC addresses (each as the connection information 54c) stored in the flash memory 54.

Here, the term "similar" means a state in which two MAC addresses differ from each other only in a few bits of 48 bits. One example of this state is a state in which two MAC addresses are identical to each other in first 40 higher-order bits and different from each other only in a few lower-order bits (e.g., eight bits). This is for the following reason: in the case where two or more SSIDs are assigned to one access point 80, when assigning an additional SSID with a MAC address different from those assigned to the other SSIDs, the MAC address for the additional SSID is in most cases created by changing only a few lower-order bits of the original MAC address. In the present embodiment, accordingly, in the case where the SSIDs are different from each other, when the MAC addresses are similar to each other, the CPU 51 determines that the connection-target access point 80 is the same as the access point 80 with which the MFP 1 previously establishes wireless communication. When the CPU 51 at S108 determines that the MAC address assigned to the connection-target access point 80 is not similar to any of the MAC addresses (each as the connection information 54c) stored in the flash memory 54 (S108: NO), the CPU 51 at S106 executes the connection processing and the storage processing for the connection-target access point 80, and the flow in FIG. 4 ends. It is noted that there is no case where two access points 80 are different in SSID and identical in MAC address, and thus the term "not similar" means that the MAC addresses are neither identical to nor similar to each other.

Figure 5B:
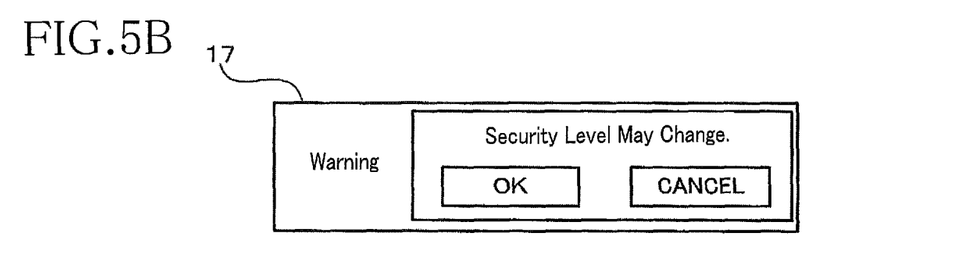

When the CPU 51 at S108 determines that the MAC address assigned to the connection-target access point 80 is similar to any of the MAC addresses (each as the connection information 54c) stored in the flash memory 54 (S108: YES), as illustrated in FIG. 5B, the CPU 51 S109 controls the touchscreen 17 to display, as a second condition, a warning or an alert that a security level for the connection-target access point 80 may change.

The CPU 51 at S110 determines whether an OK button displayed on the touchscreen 17 is selected by the user having viewed the warning. When the CPU 51 determines that the OK button is selected by the user (S110: YES), the CPU 51 at S106 executes the connection processing and the storage processing for the connection-target access point 80, and the flow in FIG. 4 ends. That is, in the case where the SSID assigned to the connection-target access point 80 differs from any of the SSIDs (each as the identification information 54b) stored in the flash memory 54, and the MAC address assigned to the connection-target access point 80 is similar to any of the MAC addresses (each as the connection information 54c) stored in the flash memory 54, when the user having viewed the warning accepts the possibility of change in security level, the CPU 51 at S106 executes the connection processing and the storage processing for the connection-target access point 80, and the flow in FIG. 4 ends.

When the CPU 51 at S110 determines that the OK button is not selected by the user (S110: NO), the CPU 51 at S102 controls the touchscreen 17 to display a result of the search of the connectable access points 80 and waits until the user operates the touchscreen 17 to select a particular one of the SSIDs displayed on the touchscreen 17 (S103: NO).

Figure 5C:
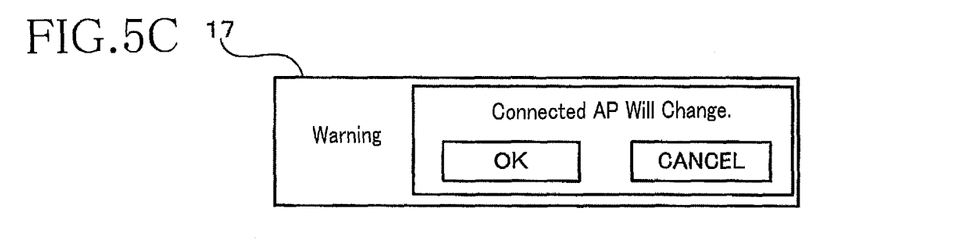

When the CPU 51 at S107 determines that the SSID assigned to the connection-target access point 80 is identical to any of the SSIDs (each as the identification information 54b) stored in the flash memory 54 (S107: YES), the CPU 51 at S111 determines whether the MAC address assigned to the connection-target access point 80 is identical to the connection information 54c (i.e., the MAC address) that is paired with the identification information 54b identical, in the determination at S107, to the SSID assigned to the connection-target access point 80. This connection information 54c may be hereinafter referred to as "particular connection information 54c. When the CPU 51 determines that the MAC address assigned to the connection-target access point 80 is not identical to the particular connection information 54c (i.e., the MAC address) (S111: NO), as illustrated in FIG. 5C, the CPU 51 at S112 controls the touchscreen 17 to display, as a first condition, a warning that the connection-target access point 80 differs from the access point 80 with which the MFP 1 previously establishes wireless connection. This is for the following reason: when the MAC addresses are not identical even though the SSIDs are identical, there is a high possibility that the connection-target access point 80 differs from the access point 80 with which the MFP 1 previously establishes wireless connection, which generates the need for checking with the user. It is noted that when the MAC address assigned to the connection-target access point 80 is similar to the particular connection information 54c (i.e., the MAC address), the negative decision is made at S111 (S111: NO).

The CPU 51 at S110 determines whether an OK button displayed on the touchscreen 17 is selected by the user having viewed the warning. When the CPU 51 determines that the OK button is selected by the user (S110: YES), the CPU 51 at S106 executes the connection processing and the storage processing for the connection-target access point 80, and the flow in FIG. 4 ends.

When the CPU 51 at S111 determines that the MAC address assigned to the connection-target access point 80 is identical to the particular connection information 54c (i.e., the MAC address) (S111: YES), the CPU 51 determines that the connection-target access point 80 is an access point 80 to which the MFP 1 is previously connected, and the CPU 51 at S113 determines whether the wireless connection previously established between the MFP 1 and the connection-target access point 80 is currently maintained. The MFP 1 may be configured such that flags each turned ON upon the start of the wireless connection and turned OFF upon the end of the wireless connection are stored in the RAM 53 for the respective SSIDs (each as the identification information), and the determination at S113 may be executed based on these flags. When the CPU 51 at S113 determines that the wireless connection previously established between the MFP 1 and the connection-target access point 80 is not currently maintained (S113: NO), the CPU 51 at S106 executes the connection processing and the storage processing for the connection-target access point 80, and the flow in FIG. 4 ends.

Figure 5D:
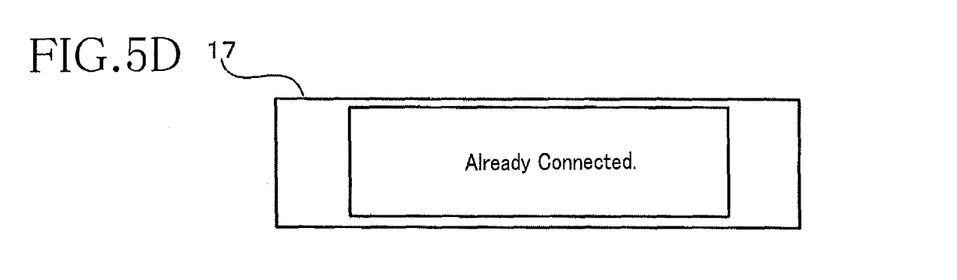

When the CPU 51 at S113 determines that the wireless connection previously established between the MFP 1 and the connection-target access point 80 is currently maintained (S113: YES), the CPU 51 at S114 maintains the current wireless connection and as illustrated in FIG. 5D controls the touchscreen 17 to display information indicating that the MFP 1 has already been connected to the connection-target access point 80, and the flow in FIG. 4 ends without execution of the connection processing and the storage processing. It is noted that maintaining the current wireless connection at S114 means that the CPU 51 does not disconnect the communication currently established and does not execute a new connection processing similar to the connection processing executed at S106.

In the MFP 1 according to the present embodiment as described above, in the case where when the wireless connection instruction is input by the user, the MFP 1 has already established the wireless connection with the access point 80 to be connected, the connection is maintained without executing a reconnection processing. This processing omits the unnecessary reconnection processing.

In the case where a pair of the identification information 54*b* and the connection information 54*c* are not stored in the flash memory 54 when the wireless connection instruction is input by the user, the CPU 51 executes the connection processing and the storage processing without displaying the warning on the touchscreen 17 for the user. This processing can quickly establish the wireless communication between the MFP 1 and the connection-target access point 80.

When the wireless connection instruction is input by the user, the CPU 51 searches the communication range for the access points 80 which can perform wireless communication with the MFP 1, and then the CPU 51 displays a list of SSIDs assigned to the respective detected access points 80. The CPU 51 then determines, as the connection-target access point 80, the access point 80 assigned with the SSID selected by the user from the list. This processing allows the user to select the connection-target access point 80, resulting in easy establishment of the wireless connection between the MFP 1 and the access point 80 desired by the user.

When the SSID assigned to the connection-target access point 80 is identical to any of the SSIDs (each as the identification information 54*b*) stored in the flash memory 54, and the MAC address assigned to the connection-target access point 80 is different from the particular connection information 54*c* (i.e., the MAC address), the CPU 51 executes the connection processing and the storage processing only when the OK button is selected by the user having viewed the warning displayed on the touchscreen 17 (i.e., the first condition). When the SSID assigned to the connection-target access point 80 is identical to any of the SSIDs (each as the identification information 54*b*) stored in the flash memory 54, and the MAC address assigned to the connection-target access point 80 is identical to the particular connection information 54*c* (i.e., the MAC address), the CPU 51 executes the connection processing and the storage processing without a need of displaying the warning and the confirmation of the user. This processing can prevent the MFP 1 from establishing wireless connection with the access point 80 not desired by the user.

When the SSID assigned to the connection-target access point 80 is identical to any of the SSIDs (each as the identification information 54*b*) stored in the flash memory 54, and the MAC address assigned to the connection-target access point 80 is different from the particular connection information 54*c* (i.e., the MAC address), the CPU 51 controls the touchscreen 17 to display the message indicating that the connection-target access point 80 differs from the access point 80 with which the MFP 1 previously establishes wireless connection. This processing can reliably notifies the user about a high possibility that the MFP 1 is connected to the access point 80 not desired by the user.

When the SSID assigned to the connection-target access point 80 is different from any of the SSIDs (each as the identification information 54*b*) stored in the flash memory 54, and the MAC address assigned to the connection-target access point 80 is similar to any of the MAC addresses (each as the connection information 54*c*) stored in the flash memory 54, the CPU 51 displays, as the second condition, the warning that the security level may change, and then when the user accepts the warning, the CPU 51 executes the connection processing and the storage processing. This second condition is set because the user expects that a security level will not change in the access point 80 different in SSID from the access point 80 previously connected but similar in MAC address to the access point 80 previously connected. Accordingly, by causing the user to recognize the possibility of change in security level, it is possible to prevent the CPU 51 to execute the connection processing at a security level not desired by the user.

In the case where the connection-target access point 80 is identical to the access point 80 with which the MFP 1 previously performs wireless connection, when the wireless connection previously established has now been maintained, the CPU 51 controls the touchscreen 17 to display the message that the MFP 1 has already been connected to the connection-target access point 80. This processing allows the user to easily recognize unnecessity of the reconnection processing.

When the CPU 51 determines that the wireless connection between the MFP 1 and the connection-target access point 80 is not established now (S113: NO), the CPU 51 immediately executes the connection processing for connecting the MFP 1 to the connection-target access point 80, without displaying the warning for the user. This processing can quickly establish the wireless connection between the MFP 1 and the access point 80 desired by the user.

While the embodiment has been described above, it is to be understood that the disclosure is not limited to the details of the illustrated embodiment, but may be embodied with various changes and modifications, which may occur to those skilled in the art, without departing from the spirit and scope of the disclosure. For example, in the above-described embodiment, in the case where the identification information 54*b* and the connection information 54*c* are not stored in the flash memory 54 when the wireless connection instruction is input by the user, the CPU 51 executes the connection processing and the storage processing without requiring a condition of displaying a notification for the user. However, the CPU 51 may execute the connection processing after displaying a notification for the user (e.g., controlling the touchscreen 17 to display information indicating execution of the connection processing). In this modification, the CPU 51 preferably executes the connection processing after the user confirms the notification.

In the present embodiment, when the wireless connection instruction is input by the user, the CPU 51 searches the communication range for the access points 80 which can perform wireless communication with the MFP 1, and then the CPU 51 displays a list of SSIDs as a result of the search. The CPU 51 then determines, as the connection-target access point 80, the access point 80 assigned with the SSID selected by the user from the list. However, the connection-target access point 80 may be determined in any method. For example, the CPU 51 may determine the access point 80 with the strongest signal strength, as the connection-target access point 80 and may register one or more SSIDs ranked in order of priority to determine the connection-target access point 80 based on the order of priority. Also, the CPU 51 may determine the connection-target access point 80 according to other procedures determined in advance.

In the present embodiment, when the SSID assigned to the connection-target access point 80 is identical to any of the SSIDs (each as the identification information 54*b*) stored in the flash memory 54, and the MAC address assigned to the connection-target access point 80 is different from the particular connection information 54*c*, the CPU 51 executes the connection processing and the storage processing only when the OK button is selected by the user having viewed the warning displayed on the touchscreen 17. However, the CPU may only display the warning for the user in this case. Also, the CPU 51 may neither display the warning nor requesting a user confirmation. Furthermore, in the present embodiment, when the SSID assigned to the connection-target access point 80 is identical to any of the SSIDs (each as the identification information 54b) stored in the flash memory 54, and the MAC address assigned to the connection-target access point 80 is identical to the particular connection information 54c, the CPU 51 executes the connection processing and the storage processing without a need of displaying a notification for the user or requesting a user confirmation. However, the CPU 51 may display a notification for the user and request a user confirmation.

While the CPU 51 controls the touchscreen 17 to display the warning that the connection-target access point 80 differs from the access point 80 with which the MFP 1 previously establishes wireless connection in the present embodiment, the CPU 51 may not display the warning.

In the present embodiment, when the SSID assigned to the connection-target access point 80 is different from any of the SSIDs (each as the identification information 54b) stored in the flash memory 54, and the MAC address assigned to the connection-target access point 80 is similar to any of the MAC addresses (each as the connection information 54c) stored in the flash memory 54, the CPU 51 displays the warning for the user, and then when the user accepts the possibility of change in security level, the CPU 51 executes the connection processing and the storage processing. The CPU 51 may execute the connection processing and the storage processing after only displaying the warning for the user. Also, the CPU 51 may execute the connection processing and the storage processing without displaying the warning or requesting a user confirmation In the present embodiment, in the case where the connection-target access point 80 is identical to the access point 80 with which the MFP 1 previously performs wireless connection, when the wireless connection previously established has now been maintained, the CPU 51 controls the touchscreen 17 to display the message that the MFP 1 has already been connected to the connection-target access point 80. However, the CPU 51 may not display the message.

In the present embodiment, when the CPU 51 determines that the wireless connection between the MFP 1 and the connection-target access point 80 is not established now, the CPU 51 immediately executes the connection processing for connecting the MFP 1 to the connection-target access point 80. However, the CPU may display the warning for the user and requesting the user confirmation.

The present invention is applied to the MFP 1 including the printer unit 30 and the scanner unit 40 in the present embodiment but may be applied to any information processing apparatus capable of carrying out wireless communication and not including at least one of the printer unit and the scanner unit.

While the MFP 1 establishes the wireless connection with the access point 80 in the present embodiment, any devices may be used as the information processing apparatus and the wireless terminal as long as the user can select a device with which wireless connection is performed, from among a plurality of devices. For example, a storage capable of performing wireless communication (as another example of the information processing apparatus) may establish wireless connection with a PC capable of performing wireless communication (as another example of the wireless terminal). Also, the PC (as another example of the information processing apparatus) may establish wireless connection with a sound device capable of performing wireless communication. A mobile terminal (as another example of the information processing apparatus) may establish wireless connection with an MFP (as another example of the wireless terminal) capable of performing wireless communication.

While Wi-Fi is used for wireless connection in the present embodiment, any technology may be used for wireless connection between the information processing apparatus and the wireless terminal. For example, ad hoc network, Wi-Fi Direct, or other similar techniques may be used for wireless connection between the information processing apparatus and the wireless terminal. In the case where Wi-Fi Direct is used, the wireless terminal acts as Group Owner.

What is claimed is:

1. An information processing apparatus, comprising:
 a communication interface;
 an operation device;
 a storage; and
 a controller configured to perform:
  determining whether an instruction for a wireless connection to a wireless terminal is accepted via the operation device;
  in response to determining that the instruction is accepted via the operation device, determining a first wireless terminal as a wireless terminal to which the information processing apparatus is to be connected, the first wireless terminal being one of at least one wireless terminal to which the information processing apparatus is allowed to be connected via the communication interface over wireless communication;
  determining whether first connection information and first identification information are stored in the storage, the first connection information being as connection information relating to the first wireless terminal, the first identification information being as identification information relating to the first wireless terminal, the connection information and the identification information relating to the at least one wireless terminal to which the information processing apparatus is allowed to be connected;
  in response to determining that the first connection information and the first identification information are stored in the storage, determining whether the wireless connection with the first wireless terminal is being established; and
  in response to determining that the wireless connection with the first wireless terminal is being established, maintaining the wireless connection with the first wireless terminal which is being established,
 wherein the information processing apparatus further comprises a display, and
 wherein the controller is configured to perform:
  when the controller determines that the instruction is accepted via the operation device, receiving a plurality of pieces of wireless connection information and a plurality of pieces of identification information from a plurality of wireless terminals as the at least one wireless terminal to which the information processing apparatus is allowed to be connected via the communication interface over the wireless communication, and controlling the display to display the plurality of pieces of identification information received via the communication interface;

determining whether an instruction indicating a selection of one of the plurality of pieces of identification information displayed on the display is accepted via the operation device; and in response to determining that the instruction indicating the selection is accepted, determining the wireless terminal corresponding to the selected one of the plurality of pieces of identification information, as the first wireless terminal.

2. The information processing apparatus according to claim 1, wherein the controller is configured to store the first connection information and the first identification information relating to the first wireless terminal, into the storage and establish the wireless connection with the first wireless terminal, when the first connection information and the first identification information relating to the first wireless terminal are not stored in the storage.

3. The information processing apparatus according to claim 1, further comprising at least one of (i) an image recording device configured to record an image on a recording medium and (ii) an image reading device configured to read the image recorded on the recording medium.

4. The information processing apparatus according to claim 1, wherein the controller is configured to perform:

when the first identification information relating to the first wireless terminal is identical to the identification information stored in the storage, when the first connection information relating to the first wireless terminal is different from the connection information stored in the storage, and when a first condition is satisfied, storing the first connection information and the first identification information into the storage and establishing the wireless connection with the first wireless terminal,; and when the first identification information relating to the first wireless terminal is different from the identification information stored in the storage, and the first connection information relating to the first wireless terminal is different from the connection information stored in the storage or when the connection information and the identification information relating to the at least one wireless terminal are not stored in the storage, storing the first connection information and the first identification information into the storage and establishing the wireless connection with the first wireless terminal even when the first condition is not satisfied.

5. The information processing apparatus according to claim 1, wherein the first condition comprises causing the display to display information indicating that the first wireless terminal is different from a wireless terminal to which the communication interface is previously connected.

6. The information processing apparatus according to claim 2, wherein the controller is configured to store the first connection information and the first identification information into the storage and establish the wireless connection with the first wireless terminal, when the first identification information relating to the first wireless terminal is not included in the identification information stored in the storage, when the first connection information is similar to the connection information stored in the storage, and when a second condition is satisfied.

7. The information processing apparatus according to claim 6, wherein the second condition comprises causing the display to display information indicating that there is a possibility that a security level in the wireless connection with the first wireless terminal is different from a security level in wireless connection with a wireless terminal to which the communication interface is previously connected.

8. The information processing apparatus according to claim 1, further comprising a display, wherein the controller is configured to, in response to determining that the wireless connection with the first wireless terminal is being established, control the display to display information that the wireless connection with the first wireless terminal is being established.

9. The information processing apparatus according to claim 1, wherein the controller is configured to perform:

determining whether the wireless connection with the first wireless terminal is being established; and establishing the wireless connection with the first wireless terminal in response to determining that the wireless connection with the first wireless terminal is not being established.

10. The information processing apparatus according to claim 1, wherein each of the at least one wireless terminal is an access point.

11. An information processing apparatus, comprising:
a communication interface;
a storage; and
a controller configured to perform:
receiving an input of a selection of a first wireless terminal from among at least one wireless terminal to which the information processing apparatus is allowed to be connected via the communication interface over wireless communication;

based on the received input of the selection of the first wireless terminal, determining the first wireless terminal as a wireless terminal to which the information processing apparatus is to be connected;

determining whether first connection information and first identification information are stored in the storage, the first connection information being as connection information relating to the first wireless terminal, the first identification information being as identification information relating to the first wireless terminal, the connection information and the identification information relating to the at least one wireless terminal to which the information processing apparatus is allowed to be connected;

in response to determining that the first connection information and the first identification information are stored in the storage, determining whether the wireless connection with the first wireless terminal is being established; and in response to determining that the wireless connection with the first wireless terminal is being established, maintaining the wireless connection with the first wireless terminal which is being established.

12. An information processing apparatus, comprising:
a communication interface;
an operation device;
a storage;
a display; and
a controller configured to perform:
receiving a plurality of pieces of wireless connection information and a plurality of pieces of identification information from a plurality of wireless terminals to which the information processing apparatus is allowed to be connected via the communication interface over the wireless communication, and controlling the display to display the plurality of pieces of identification information received via the communication interface;

determining whether an instruction indicating a selection of one of the plurality of pieces of identification information displayed on the display is accepted via the operation device;

in response to determining that the instruction indicating the selection is accepted, determining the wireless terminal corresponding to the selected one of the plurality of pieces of identification information, as a first wireless terminal to which the information processing apparatus is to be connected and which is one of at least one wireless terminal to which the information processing apparatus is allowed to be connected via the communication interface over wireless communication;

determining whether first connection information and first identification information are stored in the storage, the first connection information being as connection information relating to the first wireless terminal, the first identification information being as identification information relating to the first wireless terminal, the connection information and the identification information relating to the at least one wireless terminal to which the information processing apparatus is allowed to be connected;

in response to determining that the first connection information and the first identification information are stored in the storage, determining whether the wireless connection with the first wireless terminal is being established; and in response to determining that the wireless connection with the first wireless terminal is being established, maintaining the wireless connection with the first wireless terminal which is being established.

\* \* \* \* \*